United States Patent
Farnam

[15] 3,661,401
[45] May 9, 1972

[54] GASKET
[72] Inventor: Robert G. Farnam, New Lisbon, Wis.
[73] Assignee: F. D. Farnam Co., Lyons, Ill.
[22] Filed: May 25, 1970
[21] Appl. No.: 40,112

[52] U.S. Cl. ............................................................ 277/227
[51] Int. Cl. ...................................................... F16j 15/10
[58] Field of Search ................................ 277/227–233, 237

[56] References Cited

UNITED STATES PATENTS

| | | | |
|---|---|---|---|
| 2,116,000 | 5/1938 | Peterson | 277/227 X |
| 2,155,457 | 4/1939 | West | 277/227 X |

FOREIGN PATENTS OR APPLICATIONS

| | | | |
|---|---|---|---|
| 24,535 | 9/1935 | Australia | 277/227 |

*Primary Examiner*—Robert I. Smith
*Attorney*—Mann, Brown, McWilliams & Bradway

[57] ABSTRACT

A method of manufacturing tailored gaskets and the article produced thereby wherein a suitable gasket material is provided with a coating applied in such a manner that there is little loss of coating material, and manufacturing costs are lowered. Ideally, the gaskets are formed from materials in the sheet, blank or web form using single or multiple die-cutting operations before and after the gasket material in various forms is coated with a fluid-impermeable coating.

3 Claims, 7 Drawing Figures

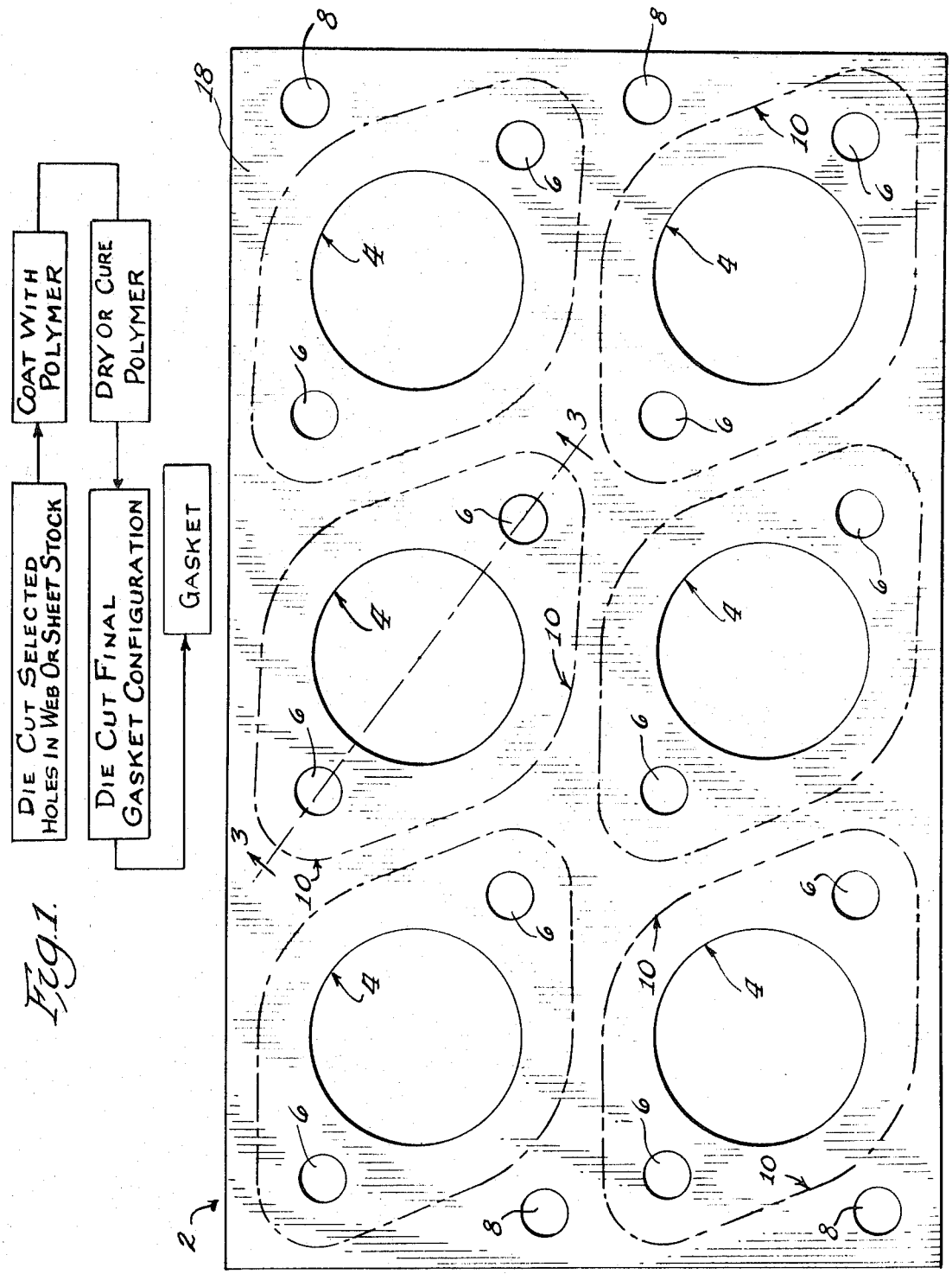

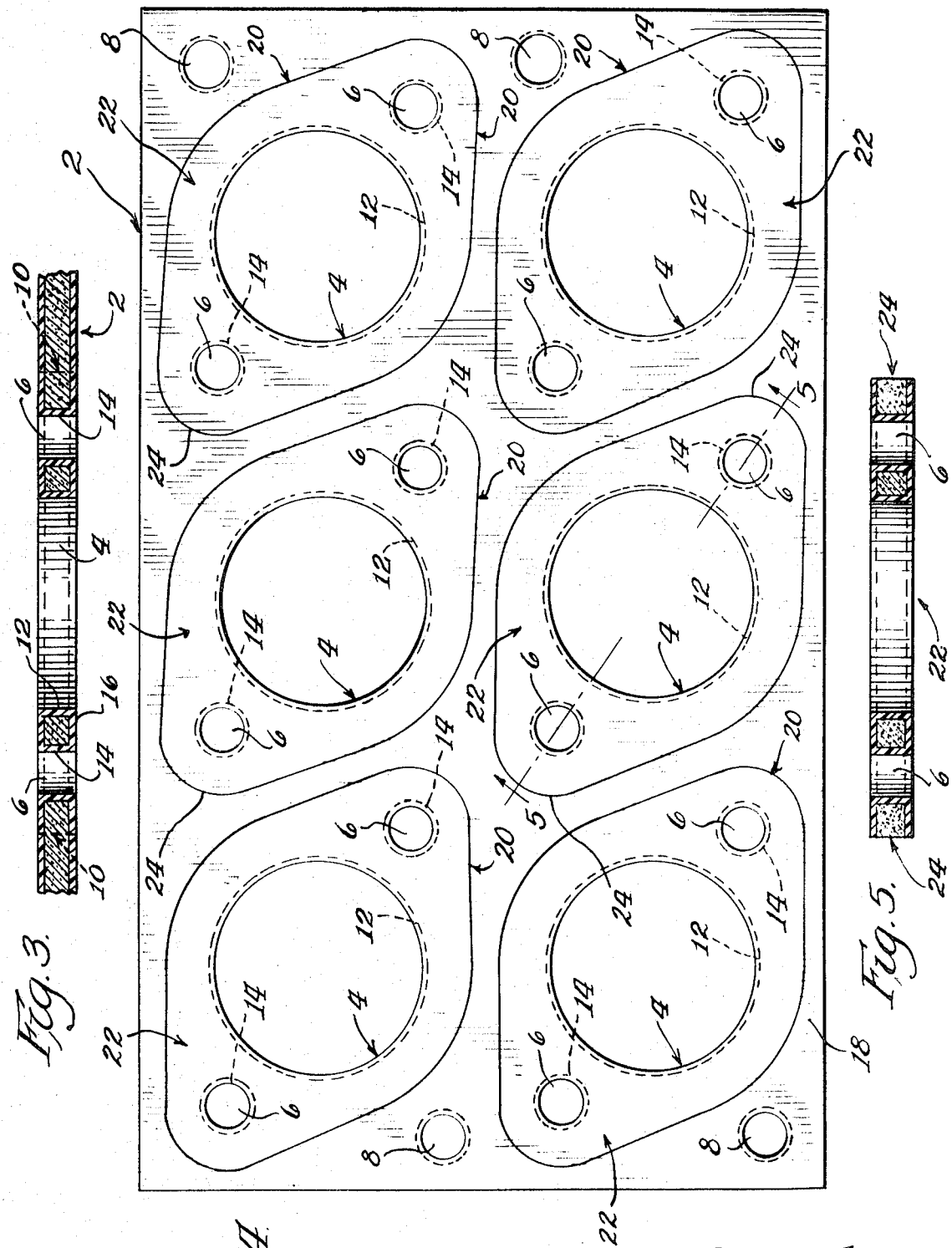

Inventor
Robert G. Farnam
By Mann, Brown, McWilliams & Bradway
Attys.

GASKET

BACKGROUND OF THE INVENTION

Basically, this invention relates to gasket formation comprising a two-part system consisting of structural core and conformable layer wherein each is selectively varied to meet a plurality of needs. Generally, the invention centers about an efficient method of forming gaskets of a tailored-to-use nature. In an exemplary embodiment, the gaskets of this invention are especially fabricated so as to have high conformability and torque retention due to the selected combination of gasket material in conjunction with a coating material, thereby making the gaskets substantially fluid-impermeable, flexible and temperature resistant. The gaskets may be provided with a specific coating which has been found to be desirable, comprising in one form, a blend of curable neoprene and phenolic resin, hereinafter referred to as "coating." These coating materials provide desirable attributes in the gaskets and also provide a coating layer which is, for the most part, impenetrable by fluids with which the gaskets of this invention are intended to be used. Where an automotive end use is intended, these coatings are highly resistant to environmental fluids, which, for the most part, comprise hydrocarbons and other fluids which may be expected to cause deterioration of some conventionally used gasket materials. Because the coatings are difficult to handle and are tenacious when brought into contact with other articles or components in the manufacturing process, a unique method of fabricating the gaskets provides a means whereby suitable gaskets and the like sealing members may be fabricated. Thus, in a specific embodiment this invention pertains to the manufacture of a gasket, such as a pan gasket or a carburetor gasket for use in automotive applications, wherein the gasket material may be one having reinforcement fibers, vegetable, mineral or otherwise, and also wherein there is a high degree of resiliency obtained ideally by void formation in the material itself or, for example, by incorporation of a resilient material and wherein a coating of material is provided on the important surfaces, apertures, holes, etc., of the formed gasket in an efficient and desirable manner, all of which produces a gasket having selected, variable properties which the prior art has not been able to provide.

Prior art gaskets have been encapsulated on both surfaces and edges with a special compound of thiokol rubber. This rubber has unusually good fuel-resistant properties, making it particularly suitable for carburetor gaskets (air horn to bowl). Although it has exceptionally good fuel-resistant properties, it is not anywhere near as impermeable to vapor or liquid penetration as it should be, and thus, when penetration occurs, it has very little effect on the thiokol, but permits changes in the "core" material. For example, most of the thiokol coating or encapsulation of gaskets is accomplished by using a product described as glue glycerin sheet packing, which is very susceptible to humidity. Using a relatively heavy coating of thiokol will provide a very good seal if only the moisture in the sheet could be held constant, thus controlling the shrinkage, torque retention, and eventually the seal in the carburetor when the gasket is clamped in place.

Impermeability, therefore, is of critical importance in order to keep the "core" dry or unaffected by the medium to be sealed. All of the materials that are eligible and being used, for example, to seal carburetor air horn to bowl gaskets, entail the use of air voids to gain a significant share of their compressibility and conformability to effect a seal. Their structure is always a compromise with the effect of wetting (with the medium to be sealed) being a significant consideration. Were the clamping loads always adequate and always uniform, the wetting problem, which affects the material structure, would not be a consideration, but such is not the case.

Materials currently in use fall into the following classes, and are designated by their proprietary names and ASTM designations:

KAOPAK B1116–130:
ASTM P3341D
Cured nitrile rubber sealant reinforced with vegetable fibers, relatively high density.

KAOBESTOS 57105:
ASTM P1151A
Chloroprene synthetic rubber sealant, cured, reinforced with asbestos fibers.

KAOBESTOS 66013:
ASTM P1242D
Cured nitrile rubber sealant, reinforced with asbestos, blended with a small percentage of vegetable fiber and granulated cork.

SHURPAK:
ASTM P3313B
This sheet is a glycerin plasticized hide glue reacted with formaldehyde (sealant) reinforced with vegetable fiber.

The sealant in this sheet is one of the most fuel-resistant products yet made by man. The finished sheet is one of the lowest cost for a suitable material, but it does have limitations with respect to moisture resistance, shelf life, dimensional stability and torque retention.

SHURPAK:
THIOKOL COATED
After cutting, encapsulated on four sides. This product is the same as plain Shurpak, except encapsulated with a film of thiokol rubber after cutting. This sheet offers some considerable improvement over the straight Shurpak, but is considerably more costly, with the instability characteristics still not resolved, since the thiokol, although unaffected by the fluids, is permeable with breathing and/or penetration.

CORK & RUBBER:
(Neoprene nitrile)
This product can be varied widely in respect to the amount of cork vs. the amount of rubber and the granule size of the cork. It provides a sheet that carries the sealing sensitivity of a sheet of soft rubber enhanced by the cork. It can be generally classed as fair to poor in torque retention and general durability for applications for bowl gaskets, and is relatively expensive.

The two-part system of this invention separates the sealing (surface and edges) from the carrier or core, which in turn can be modified to suit an application requiring a relatively uniform load or a load that is non-uniform. The system can also be "tailored" to accommodate lightly structured assemblies.

Existing materials which require a compromise in material structure entail, for example, a high percentage of sealant in the core to effect an adequate seal for a particular application, with the sealant usually being costly and yielding poor torque retention. Conversely, low sealant content is frequently used to answer a high torque requirement, but yielding difficult sealing properties combined with the effects of wetting of the whole structure.

Cork particles and rubber enhance the conformability of these structures but at the same time provides a rather poor structure in respect to torque, with particular emphasis on the fact that the torque loadings are frequently high directly under the fasteners, or machine screws or bolts, and frequently medium to low between the fasteners.

The two-part system is, of course, applicable to many other applications, some of which may require a firmer or very firm "core" material. These "core" materials may be structured from elastomeric materials reinforced with vegetable fibers, mineral fibers, or blends of the two types. The "core" may even entail blends with cork, with emphasis on the fact that the "core" and the sealant coating are separated and can be "tailored" to suit.

To recap, in order to overcome all of these shortcomings, it is apparent that something is necessary in order to ensure that the completed gasket is resistant to the total environment in which it is used. Factors tending to affect the overall picture are heat, oil, water, vibration and similar such factors. Thus, it is necessary to provide a coating on the gasket, which can be varied in texture or structure to suit the various applications in which a gasket may be used and which will provide a satisfactory fluidaimpermeable or impervious coating in order to keep the core or gasket material dry and unwetted from the fluids, whether they be liquid or otherwise, with which the gaskets are used. The use of such coatings and their application in the gasket field is both expensive and difficult because of the intrinsic tenaciousness of the polymer coatings and because of the necessary steps in the manufacture of gaskets. The herein disclosed method of fabricating an ideal type of gasket in an efficient manner, while maintaining the whole process within feasible economic boundaries, forms the subject matter of this invention.

SUMMARY OF THE INVENTION

Basically, in an exemplary embodiment, the invention pertains to a method of producing coated gaskets, while keeping the amount of coating used within feasible economic limits and maintaining the coating in a uniform layer with selected variances consisting of the sequential performance of several steps. These steps include providing core or gasket material which may be in the web, blank or sheet form with a plurality of initial die-cuts, wherein these cuts form the interior of the finished gaskets, bolt holes and/or pilot holes (where desired, outside the intended configurational boundaries of the finished gaskets). Next, a coating is applied to the die-cut web or sheet, wherein the coating is capable of imparting fluid resistance and of providing conformability to the gasket material core. Preferably the coating is thicker on the walls of the apertures than elsewhere. The coating is then at least partially cured or dried and thereafter the coated web or sheet is again subjected to a die-cutting operation to form the outer peripheral edges of gaskets of desired shape. Thereafter, in the web embodiment, the waste gasket material containing the pilot holes, where formed and being contiguous to the gaskets, is discarded. The pilot holes in one embodiment are used in order to support the web or sheet containing the partially cut members during the partial curing process, so as not to disturb the coating or to create difficulties in handling the coating during the partial curing cycle and for subsequent alignment in final cutting and recovery of the gaskets.

BRIEF DESCRIPTION OF THE DRAWINGS

FIG. 1 is a flow chart illustrating one of the methods of the invention;

FIG. 2 is a schematic and diagrammatic representation of the preliminary cutting step of one of the methods of the invention;

FIG. 3 is a view taken along the line of 3 — 3 of FIG. 2, showing the coated, initially die-cut member of FIG. 2;

FIG. 4 depicts the member of FIG. 2 after the final cutting process in the exemplary method of the invention;

FIG. 5 is a view taken along the line 5 — 5 of FIG. 4;

DESCRIPTION OF THE PREFERRED EMBODIMENTS

Figure 6:
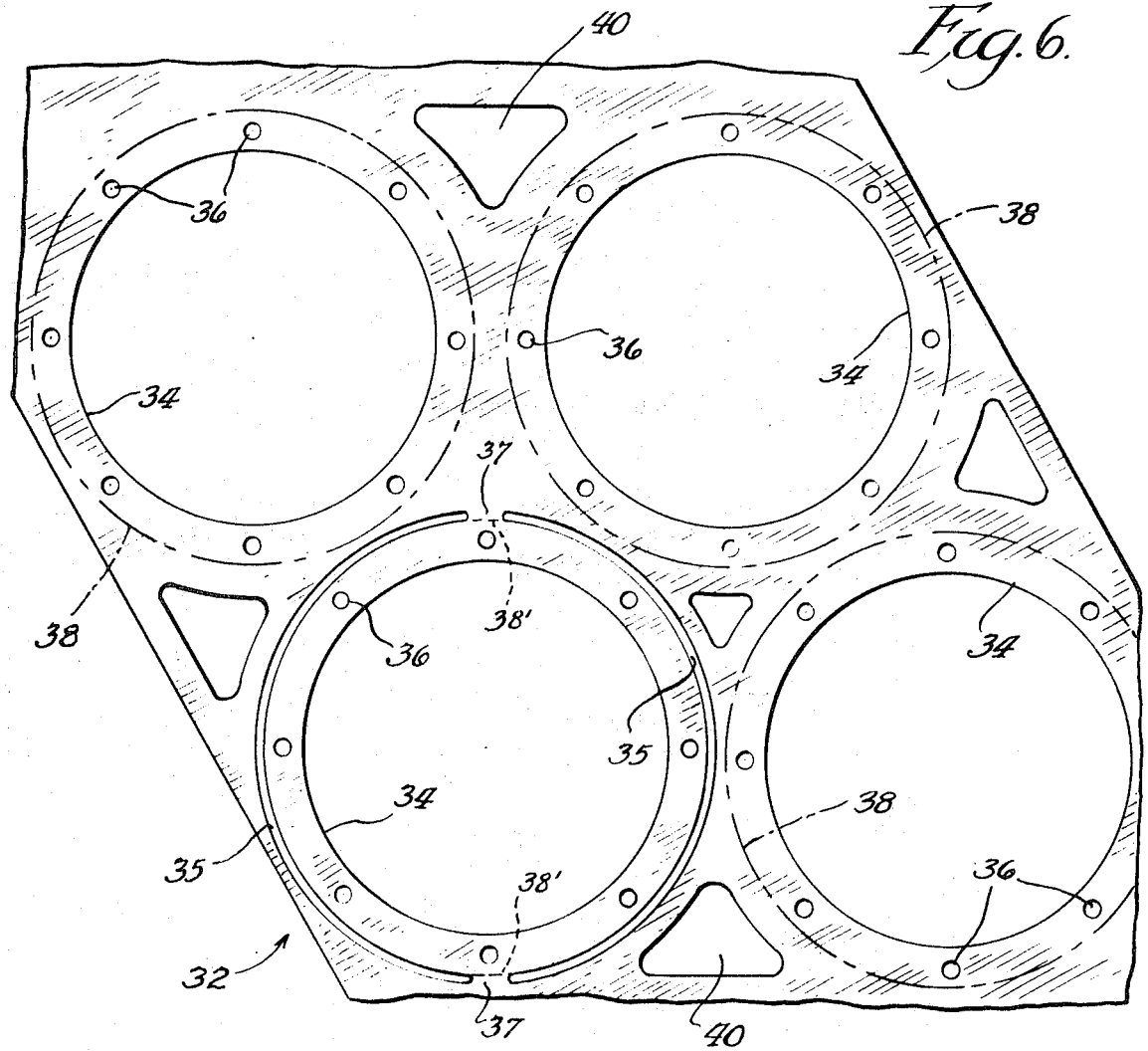
FIG. 6 is a plan view, schematically illustrating the application of the method of the invention in a different form.

Referring now to FIGS. 1 – 5, inclusive, a basic and general exemplary embodiment of the invention will now be discussed. Generally speaking, the core or gasket material, which may be one having fiber reinforcements (whether these fibers be vegetable, mineral or otherwise), is made available in web or blank, strip or sheet form. For purposes of disclosure, the invention as it is practiced with respect to cut blanks or sheets will be described, it being understood that the same general steps and method disclosed are applicable to gasket materials in web form with little or no modification, or except as indicated. The sheet of gasket material 2 is subjected to an initial or preliminary die-cutting operation, which die-cutting is accomplished with a single or multiple die; multiple dies being preferred in order to make the method as efficient as possible. The dies will have a specific configuration, depending upon the end configuration of the desired gasket. In the case illustrated, a plurality of center or central holes 4 are cut while at the same time spaced bolt holes 6 and spaced pilot holes 8 are also cut. The dotted lines 10 generally designate the final configuration that the individual gaskets will take after the later steps of the method of the invention have been practiced. It is understood that the spaced central holes 4, as well as the bolt holes 6 and pilot holes 8 are formed in the sheet or web of gasket material prior to any coating process. The preliminarily die-cut sheet 2, as shown in FIG. 2, is then coated with the coating material, the specifics of which will be discussed in more detail hereinafter. Coating of the die-cut sheet is preferably accomplished by means of mop-type rollers; i.e., paint rollers having deep piles, and with the coating being done with other procedures and apparatus otherwise generally known in the art, and some specifics of which will be more specifically described hereinafter. For convenience, this particular type of coating will be termed "mop-coating". When sheet 2 is put through the nip of one or a plurality of mop-rollers disposed in close relationship, sheet 2 becomes completely coated as shown in FIG. 3, including the walls of the various apertures which have been die-cut therein. Preferably, a heavier coating (not shown) will develop at and around the die-cut edges of openings, holes, etc. Thus, these openings should initially be cut to a size to compensate for this coating buildup. So that the coating will not "bridge," suitable air-knives may be used to help break the surface tension forces of the bridging molecules of the coating. Referring now, specifically, to FIG. 3, it will be noted that the interior surface 12 of the central opening 4, as well as the interior surface of the bolt holes 14, are provided with a coating 16, as indicated by the dotted lines around the apertures, this preferably being accomplished by mop-rollers, but which may be accomplished by spraying means or squeegee methods.

After sheet 2 has been coated with the curable composition, it is at least subjected to a drying process and preferably a partial curing process, so that the coated gasket material or core may be easily handled and further processed. Ideally, sheet 2 is hung on a holding means or hook of a curing apparatus, which may utilize heat, light, warm air or any other curing medium, in order to effect at least partial curing of the coating 16 disposed on one or more surfaces of sheet 2. Preferably, the coating is completely cured or set up, so that it is more easily handled in the subsequent steps of the method of the invention. It should be noted that, by providing pilot holes 8 (which may serve as alignment holes in subsequent die-cutting apertures), the sheet 2 may be easily transported, and as the pilot holes 8 are located contiguous to and outside the outer boundaries of the gaskets which are ultimately to be formed and are in the scrap material 18 defined by the dotted lines 10, the curing step does not interfere with the selected variance or uniformity of coating 16. The dotted line 10, of course, indicates the outside edge of the gasket which is yet to be formed in the subsequent cutting operation.

Referring now, specifically, to FIG. 4, it can be seen that the coated and cured sheet 2 has been subjected to another die-cutting operation, which dies form the cuts 20, each of which form the desired and selected outer configuration of the individual gaskets 22. The pilot holes 8 help align the sheet material for the final cutting step and also aid in the recovery of the individual gaskets. The second die-cut of the sheet 2 provides a plurality of gaskets 22 and, of course, the dies are so situated and configured so as to obtain the maximum number of gaskets 22 from sheet 2. It will be seen that when the last and final die-cut is made, the individual gaskets 22 are punched or cut from the sheet 2, such that there is a raw or uncoated edge 24 (FIG. 5). This raw or uncoated edge 24 extends around the outer peripheral edges of the gasket 22, but is not detrimental in that, under most conditions, the sealing of this edge is not warranted or necessary, since in most cases gaskets are used to keep fluids or gasses from escaping outwardly. There are some cases, however, where a gasket must seal in both directions, and where desired, the individual gaskets 22 may be subjected to still another coating operation as previously and hereafter described to coat the raw edges 24 and to additionally provide another layer of coating on top of the previously formed coating 16. In other instances, as later described, an additional peripheral die-cut around the intended outer boundaries of the gaskets may be provided at the time of initial die-cutting. Application of the coating may also be accomplished by other means, as by spraying, for instance. Also, the coating may be applied only to the intended gasket portion of the sheet or web, leaving that portion of the web or sheet containing the pilot holes, etc., free of coating, thereby conserving on the amount used.

While throttle body types of gaskets have been illustrated in the figures just described, it is to be understood that the same method of forming coated gaskets also applies where the gasket is of oil pan-like configuration or any other type of configuration having one or a plurality of spaced openings or holes. Referring now to FIG. 6, there is illustrated in schematic fashion a sheet of material 32, which has been provided with a plurality of spaced central openings 34 and spaced bolt hole openings 36, for example, with the dotted lines 38 indicating the form that the individual gaskets will take after the final die-cutting operation. So as to reduce the amount of coating material that will be used to coat the individual gaskets, the central holes 34, as well as bolt holes 36, are cut and the spaced holes 40 contiguous to the dotted lines 38 may also be punched from the web or sheet of material 32, which holes will provide means by which the sheet 32 may be handled as in the curing process, or for no other purpose than to cut down the amount of coating material that would be necessary to coat the individual sheets 32. It should be understood that all of the steps of the invention may be practiced with the gasket materials in web form, in which case the pilot or other cut-out, such as 40, will not be needed for carrying the sheets through the preliminary or partial or full curing cycle, although they may be useful for registration and individual gasket recovery. For instance, where the invention is practiced on material in the web form, it may be conducted while in the web form through a drying oven or other device used for effecting full cure of the polymer coating and then subjected to the final gang-die-cutting step while still in the web form, and then, of course, recovering the individual gaskets and scrapping the contiguous selvage or scrap which will still be in a somewhat "mutilated" web form.

The lowermost left-hand portion of FIG. 6 illustrates still another attribute to be obtained and which has been alluded to earlier. Where the coating is desired on a major portion of the extreme edge of the finished gasket, and so as to obviate the need of a second coating step, an outer-configurational cut, such as 35, may be made at the same time that central opening 34, bolt holes 36 and portions 40 are cut. It will be noted that tabs 37 will form means whereby the nearly totally cut gasket will be retained within the sheet, blank or web. The number of tabs, as well as their placement, will be dictated by the size and shape of the individual gaskets. Thus, in this form, a coating will be provided on a majority of the exterior peripheral edge of the individual gaskets. The final die-cutting operation in this embodiment will sever the connecting tabs 37 essentially along the dotted line 38'. The small portion of the uncoated edge between the adjacent extremities of concentric-like holes 35 will not be detrimental.

Figure 7:
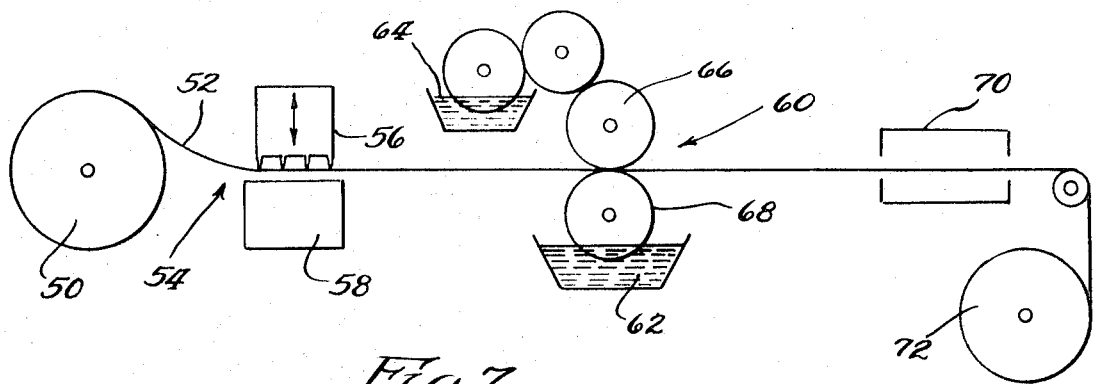
FIG. 7 is a schematic illustration showing how a web of gasket material is coated using one of the methods of the invention.

Referring now to FIG. 7, a schematic showing of how the gasket material is coated and illustrating still another facet of the invention will be described. It should be understood that while the coating process is described for the gasket material in web form, the same general method may be used where the material is in sheet form. From a roll 50 of gasket material, the web 52 is first passed through a preliminary die-cutting station, generally designated 54, where the reciprocally mounted gang-die 56 coacting with platen 58 preliminarily cuts the central openings, bolt holes and/or pilot holes, where necessary, as earlier described. Thereafter, the web 52 passes through a coating applying station, generally designated 60, where coating material in troughs 62 and 64 is applied to the precut web 52 on both top and bottom surfaces by opposed mop-rolls 66 and 68. Because the felt-like coverings of mop-rolls 66 and 68 are of deep pile, the coating is easily applied to the interior surfaces of the already die-cut holes and openings. Thereafter, the web 52 may be passed through a drying oven or curing fixture, such as 70, and thereafter rolled onto roll 72 for later use, in which case the rolled web is passed through a cutting station similar to 54 for the final die-cutting operation, at which time the individually cut gaskets are separated from the remainder of the web in finished form.

The gasket materials contemplated for use with the practice of this invention may take a variety of configurations and compositions. Generally speaking, the most desirable core material would be cured rubber (for example, chloroprene, nitrile SBR and the like) reinforced with vegetable and/or mineral fibers blended with cork, or the above type rubbers reinforced with asbestos fibers and/or asbestos fibers blended with cork. Disclosure of some such materials may be found in U. S. Pat. Nos. 2,676,099, 2,884,060 and 3,082,145 to Kao.

Generally speaking, the ultimate use to which the formed gasket will be put will dictate the thickness, rigidity, stability and sturdiness of the various materials and components used for the gasket material. A number of commercially available prior art gasket materials having the desired characteristics will be suitable in the practice of this invention. Generally, the thickness of such core materials will be that suitable to allow the material to be rolled on a drum, although this is not always important. Another consideration is the dimensional stability of the material as it may be affected by the practice of the invention.

Perhaps the outstanding consideration influencing the selection of the core material is the fact that the coating material, hereinafter described in more detail, provides the required attributes for sealing across the faces, through the body, and around the apertures of the gasket, but is of such a character, and is sufficiently thin, that it has little effect upon the basic physical properties of the gasket, other than sealing. Therefore, the core material may be selected or "tailored" to provide the required compressibility, conformability, recuperation, tensile, torque retention, fluid and gas resistance, temperature resistance, etc., characteristics so that, in conjunction with the seal coating, the gasket is able to perform its intended function and provide effective sealing of the mated parts under the operating environment, with the assembly being appropriately held together with minimum clamping pressure and with the desired torque retention.

Although the core member would in most applications involve materials in which the fibers are admixed with the cured rubber in the well-known beater process, or in the processes disclosed in the heretofore-mentioned Kao patents, it should be borne in mind that conventional fiberboard, or other fibrous sheet material, may be suitably impregnated with elastomeric material, or other suitable binder, to provide the basic physical characteristics that are needed for certain gasket applications.

The material used in the coating process and used in fabricating the gaskets of this invention may be tailored for firmness or softness and is one which is characterized as having a high fluid resistance by which is meant that the polymer after total curing or setting up is capable of forming a substantially fluid-impermeable or impervious barrier. Types of these materials which have been found satisfactory include those which are thermo-setting at a temperature of about 325° − 400° F. Satisfactory polymers include blends of synthetic elastomers such as neoprene and nitrile rubber with synthetic resins such as phenolic resin with appropriate curing agents, which material may be applied to the core of gasket material as a water or solvent dispersion. It may then be dried carefully and cured, as will be apparent. Where the phenolic resin type polymer is used, it will be found that when the coating is cured after drying, the resin actually softens or melts materially in its combining process with the synthetic rubber, which gives the coating its impermeability. Where a relatively soft coating is used, for example on a carburetor air horn to bowl gasket, flow of the material into fissures, dents, pores, etc., of mating parts will occur to such an extent that a mechanical bond will result. To prevent this, a release coating of known prior art composition, or one of the fluro carbons may be placed over the coating's surfaces, and serves in a sense as a lubricant. A release coating that is chemically compatible with the coating is, of course, desirable.

The types of polymer materials used as a coating should have the requisite resistance to heat, chemicals and solvents, depending upon the environment in which the gaskets are ultimately to be used, and whether or not they will be exposed to elevated temperatures and the like. Other polymer materials, resins and elastomers, as disclosed in United States patent to Farnam et al., U.S. Pat. No. 3,158,526, may also be used. The particular polymers, elastomers and resins which are selected will be chosen for their respective properties, and thereby "-tailored" to suit the environmental conditions of the particular application, and the relative proportions may also be varied as suggested by such conditions.

The process of the invention lends itself to the provision of as thick or thin a polymer coating as may be necessary for ultimate end uses, but usually the thickness of the polymer layer applied to the surface of either the sheet or web of gasket material will be about 0.0001 – 0.005 inch. The preferred thickness is probably 0.001 – 0.002 inch. The coating will have a tendency to build up or collect at the edges of the die-cut parts, and hence will be about double the thickness of the surface coating. Consequently, the die-cutting process should be modified to allow for these tolerances.

In general, after the application of the polymer coating, the sheet, blank or web is subjected to at least a drying or partial curing process so as to enable the coated sheet or web to be handled without fear of disrupting the layer of coating and to permit additional die-cutting of the web or sheet to form the finished gasket. Sometimes the coated, dried web will be rolled upon itself and stored for later completion of the gasket-forming operation. The partial or full curing may take the form of application of pressure and heat, heat alone, or merely air drying for a period of time in order to allow the particular polymer material used to satisfactorily set up. In some instances, partial drying may provide the handleability to the web or sheet in order to perform subsequent operations thereon. In this event, the cut gaskets may be not fully cured, the final curing being carried out after the formation of the finished gasket, and after it has been used in the environment intended. Preferably, however, in order to obtain all of the attributes of this invention, a fully cured coating is contemplated prior to the final die-cutting operation of the finished gasket, and particularly in uses where a high degree of impermeability is needed to protect the core material. Of course, there may be applications where something less than a complete cure may be adequate, and this situation is also contemplated.

As indicated earlier, the specific configuration of the gaskets following the method of the invention may be many. Automatic transmission pan gaskets, automotive engine pan gaskets, valve cover gaskets, carburetor air horn to bowl gaskets, and similar gaskets made according to the teachings of this invention have been found to work especially well. The specific outer configuration, as well as the number of bolt holes and the shape of the interior hole or central opening, may vary widely and need not follow any specific specification.

Thus, there has been disclosed a novel coated gasket, and a method of forming such coated gaskets, which method keeps the amount of coating material used to a minimum, and which provides means whereby the coating material need not be disturbed and may be kept in a selected or continuous layer or state so as to provide a coated gasket which will have the desired characteristics of conformability and sealability tailored to meet a variety of end uses.

The embodiments in which an exclusive property or privilege is claimed are defined as follows:

1. A gasket comprising a core of packing material having all of the required physical properties of the gasket, except for sealability, being provided in the material and structure of the core, said core having one or more apertures inwardly spaced from the peripheral edge thereof, the top and bottom surfaces of the gasket and the interior walls of said aperture or apertures having a unitary and continuous layer of at least partially cured elastomer-resin coating thereon, said coating being formed from a thermosetting mixture of synthetic elastomer with synthetic resin, with the mixture curing at temperature within the range of 325° – 400° F., and in which the coating has a thickness between 0.0001 inch and 0.005 inch, said coating material serving the sole function of providing the requisite sealing characteristics for protecting the core material from the deleterious effect of the environment in which the gasket is used and for effecting a fluid seal along the top and bottom surfaces when the gasket is clamped between adjacent members.

2. A gasket as set forth in claim 1 in which the thickness of the coating on the interior aperture walls is substantially greater than the thickness of said coating on the top and bottom surfaces of the gasket.

3. A gasket as set forth in claim 1 in which a release coating covers said rubber-resin coating on said top and bottom surfaces.

* * * * *